United States Patent
Kindo et al.

(10) Patent No.: US 9,904,846 B2
(45) Date of Patent: Feb. 27, 2018

(54) PEDESTRIAN BEHAVIOR PREDICTING DEVICE AND PEDESTRIAN BEHAVIOR PREDICTING METHOD

(75) Inventors: Toshiki Kindo, Yokohama (JP); Masahiro Ogawa, Sosuno (JP); Ryuji Funayama, Yokohama (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 617 days.

(21) Appl. No.: 14/346,015

(22) PCT Filed: Sep. 20, 2011

(86) PCT No.: PCT/JP2011/071398
§ 371 (c)(1),
(2), (4) Date: Mar. 20, 2014

(87) PCT Pub. No.: WO2013/042205
PCT Pub. Date: Mar. 28, 2013

(65) Prior Publication Data
US 2014/0219505 A1    Aug. 7, 2014

(51) Int. Cl.
| G06K 9/00 | (2006.01) |
| G08G 1/08 | (2006.01) |
| G08G 1/16 | (2006.01) |

(52) U.S. Cl.
CPC ..... *G06K 9/00369* (2013.01); *G06K 9/00342* (2013.01); *G06K 9/00348* (2013.01);
(Continued)

(58) Field of Classification Search
None
See application file for complete search history.

(56) References Cited

U.S. PATENT DOCUMENTS

2010/0076621 A1* 3/2010 Kubotani ............... G08G 1/166
 701/1
2015/0049908 A1* 2/2015 Ogawa ................... G08G 1/166
 382/103

FOREIGN PATENT DOCUMENTS

| JP | 2007-264778 A | 10/2007 |
| JP | 2009-294842 A | 12/2009 |

(Continued)

OTHER PUBLICATIONS

Chen, Zhuo, D. C. K. Ngai, and N. H. C. Yung. "Pedestrian behavior prediction based on motion patterns for vehicle-to-pedestrian collision avoidance." 2008 11th International IEEE Conference on Intelligent Transportation Systems. IEEE, 2008.*

(Continued)

*Primary Examiner* — Chan Park
*Assistant Examiner* — Geoffrey E Summers
(74) *Attorney, Agent, or Firm* — Andrews Kurth Kenyon LLP (57) ABSTRACT

According to the present invention, a pedestrian is detected from an imaged image and a partial image including the pedestrian is extracted, shape information of the pedestrian acquired from the extracted partial image is accumulated and the shape information of a predetermined time before and the current shape information are compared using the accumulated shape information to detect change in the movement of the pedestrian, discontinuous movement estimating information indicating a discontinuous movement of the pedestrian that occurs following the change in the movement of the pedestrian is acquired from a storage means at the time the change in the movement of the pedestrian is detected, and a behavior of the pedestrian is predicted using the acquired discontinuous movement estimating information.

20 Claims, 5 Drawing Sheets

(52) U.S. Cl.
CPC ............ *G06K 9/00805* (2013.01); *G08G 1/08* (2013.01); *G08G 1/166* (2013.01); *B60W 2420/40* (2013.01); *B60W 2550/10* (2013.01)

(56) References Cited

FOREIGN PATENT DOCUMENTS

| | | |
|---|---|---|
| JP | 2010-079639 A | 4/2010 |
| JP | 2010-102437 A | 5/2010 |
| JP | 2010-165003 A | 7/2010 |

OTHER PUBLICATIONS

Nedevschi, Sergiu, Silviu Bota, and Corneliu Tomiuc. "Stereo-based pedestrian detection for collision-avoidance applications." IEEE Transactions on Intelligent Transportation Systems 10.3 (2009): 380-391.*

Kifer, Daniel, Shai Ben-David, and Johannes Gehrke. "Detecting change in data streams." Proceedings of the Thirtieth international conference on Very large data bases—vol. 30. VLDB Endowment, 2004.*

Keller, Christoph G., Christoph Hermes, and Dariu M. Gavrila. "Will the pedestrian cross? Probabilistic path prediction based on learned motion features." Joint Pattern Recognition Symposium. Springer Berlin Heidelberg, 2011.*

T. Gandhi et al., "Pedestrian Protection Systems: Issues, Survey, and Challenges," IEEE Transactions on Intelligent Transportation Systems, vol. 8, No. 3, Sep. 2007, pp. 413-430.

I.N. Junejo et al., "View-Independent Action Recognition from Temporal Self-Similarities," IEEE Transactions on Pattern Analysis and Machine Intelligence, vol. 33, No. 1, Jan. 2011, pp. 172-185.

Shimizu, Hiroaki, "Direction Estimation of Pedestrian from Images", Massachusetts Institute of Technology—Artificial Intelligence Laboratory, AI Memo 2003-020 (Aug. 2003), 12 pages.

\* cited by examiner

PEDESTRIAN BEHAVIOR PREDICTING DEVICE AND PEDESTRIAN BEHAVIOR PREDICTING METHOD

CROSS-REFERENCE TO RELATED APPLICATION

This is a national phase application based on the PCT International Patent Application No. PCT/JP2011/071398 filed on Sep. 20, 2011, the entire contents of which are incorporated herein by reference.

FIELD

The present invention relates to a pedestrian behavior predicting device and a pedestrian behavior predicting method.

BACKGROUND

A technique of predicting the behavior of a pedestrian at the periphery of a vehicle has been conventionally developed.

For example, a patent literature 1 discloses a pedestrian detecting device for extracting feature points from an image imaged with a camera, calculating movement information including a moving speed and/or moving direction of the extracted feature points, extracting a target region including a moving target three-dimensional object from the imaged image based on the calculated movement information of the feature points, comparing the movement information associated with the extracted target region and the movement information associated with a comparison region set at a periphery of the target region, and determining whether or not the target three-dimensional object included in the extracted target region is a pedestrian based on the comparison result of the movement information.

Patent literature 2 discloses a pedestrian rush out predicting device for acquiring time series change of the position and the moving speed and the peripheral information of the pedestrian existing at a front side of the own vehicle, comparing the acquired time series change of the position and the moving speed and the pattern of the time series change of the position and the moving speed of when the pedestrian rushes out to a road, and comparing the acquired peripheral information and the peripheral information obtained in advance for when the pedestrian rushes out to the road to predict whether or not the pedestrian will rush out to the road on which the own vehicle is travelling.

CITATION LIST

Patent Literature

Patent Literature 1: Japanese Patent Application Laid-open No. 2009-294842
Patent Literature 2: Japanese Patent Application Laid-open No. 2010-102437

SUMMARY

Technical Problem

However, the behavior of the pedestrian at the periphery of the vehicle cannot be rapidly and accurately predicted in the conventional art (the patent literatures 1 and 2, etc.). For example, the pedestrian detecting device described in the patent literature 1 can capture the movement of the pedestrian and predict the linear rush out movement (continuous movement) of the pedestrian that is linearly predictable as the extension of the movement, but cannot predict the movement (discontinuous movement) of suddenly changing direction and rushing out to the road. Furthermore, the pedestrian rush out predicting device described in the patent literature 2 cannot ensure sufficient precision of environmental recognition and thus can still be improved.

In light of the foregoing, it is an object of the present invention to provide a pedestrian behavior predicting device and a pedestrian behavior predicting method capable of rapidly and accurately predicting the behavior of the pedestrian at the periphery of the vehicle.

Solution to Problem

A pedestrian behavior predicting device according to the present invention includes a pedestrian detecting means configured to detect a pedestrian from an imaged image and extract a partial image including the pedestrian; a movement change detecting means configured to detect change in movement of the pedestrian by accumulating shape information of the pedestrian acquired from the partial image extracted by the pedestrian detecting means and comparing the shape information of a predetermined time before and the current shape information using the accumulated shape information; a discontinuous movement estimating means configured to acquire discontinuous movement estimating information indicating a discontinuous movement of the pedestrian that occurs following the change in the movement of the pedestrian from a storage means at the time the change in the movement of the pedestrian is detected by the movement change detecting means; and a behavior predicting means configured to predict a behavior of the pedestrian using the discontinuous movement estimating information acquired by the discontinuous movement estimating means.

In the pedestrian behavior predicting device, it is preferable that the movement change detecting means detects the change in the movement of the pedestrian by acquiring a feature amount distribution representing the shape information of the pedestrian acquired from the partial image extracted by the pedestrian detecting means, normalizing the shape information represented by the acquired feature amount distribution, accumulating the normalized shape information, and comparing the shape information of a predetermined time before and the current shape information using the accumulated shape information.

In the pedestrian behavior predicting device, it is preferable that the discontinuous movement estimating means calculates an optical flow of the imaged image and acquires the discontinuous movement estimating information using the optical flow at the time the change in the movement of the pedestrian is detected by the movement change detecting means.

In the pedestrian behavior predicting device, it is preferable that the pedestrian detecting means acquires a position of the pedestrian on the imaged image, the pedestrian behavior predicting device preferably further includes a continuous movement estimating means configured to generate continuous movement estimating information indicating a continuous movement of the pedestrian that occurs following movement of the position of the pedestrian based on a history of positions of the pedestrian acquired by the pedestrian detecting means, and it is preferable that the behavior predicting means predicts the behavior of the pedestrian based on the continuous movement estimating information generated by the continuous movement estimating means.

In the pedestrian behavior predicting device, it is preferable that the discontinuous movement estimating information and the continuous movement estimating information include at least one of a moving direction and a moving speed of the pedestrian.

In the pedestrian behavior predicting device, it is preferable that the movement change detecting means further includes a shape information acquiring means configured to acquire the feature amount distribution of the pedestrian from the partial image extracted by the pedestrian detecting means using a predetermined feature amount, a normalizing means configured to normalize the feature amount distribution acquired by the shape information acquiring means and acquire a probability distribution corresponding to the feature amount distribution, a shape information accumulating means configured to accumulate the probability distribution acquired by the normalizing means, and a change detecting means configured to calculate a difference between the probability distribution of a predetermined time before and the current probability distribution accumulated by the shape information accumulating means using a predetermined scale, and detect the change in the movement of the pedestrian at the time the calculated difference is greater than a predetermined threshold value.

A pedestrian behavior predicting method according to the present invention includes a pedestrian detecting step configured to detect a pedestrian from an imaged image and extract a partial image including the pedestrian; a movement change detecting step configured to detect change in movement of the pedestrian by accumulating shape information of the pedestrian acquired from the partial image extracted in the pedestrian detecting step, and comparing the shape information of a predetermined time before and the current shape information using the accumulated shape information; a discontinuous movement estimating step configured to acquire discontinuous movement estimating information indicating a discontinuous movement of the pedestrian that occurs following the change in the movement of the pedestrian from a storage means at the time the change in the movement of the pedestrian is detected in the movement change detecting step; and a behavior predicting step configured to predict a behavior of the pedestrian using the discontinuous movement estimating information acquired in the discontinuous movement estimating step.

In the movement change detecting step, it is preferable that the change in the movement of the pedestrian is detected by acquiring a feature amount distribution representing the shape information of the pedestrian acquired from the partial image extracted in the pedestrian detecting step, normalizing the shape information represented with the acquired feature amount distribution, accumulating the normalized shape information and comparing the shape information of a predetermined time before and the current shape information.

In the discontinuous movement estimating step, it is preferable that an optical flow of the imaged image is calculated, and the discontinuous movement estimating information is acquired using the optical flow at the time the change in the movement of the pedestrian is detected in the movement change detecting step.

It is preferable that a position of the pedestrian on the imaged image is acquired in the pedestrian detecting step, the pedestrian behavior predicting method preferably further includes a continuous movement estimating step configured to generate continuous movement estimating information indicating a continuous movement of the pedestrian that occurs following movement of the position of the pedestrian based on a history of positions of the pedestrian acquired in the pedestrian detecting step, and the behavior of the pedestrian is preferably predicted in the behavior predicting step based on the continuous movement estimating information generated in the continuous movement estimating step.

Advantageous Effects of Invention

The present invention has an effect of rapidly and accurately predicting the behavior of the pedestrian at the periphery of the vehicle.

DESCRIPTION OF EMBODIMENTS

Hereinafter, embodiments of a pedestrian behavior predicting device and a pedestrian behavior predicting method according to the present invention will be described in detail based on the drawings. It should be noted that the present invention is not to be limited by the embodiments. Furthermore, the configuring elements described in the following embodiments include elements that can be easily contrived by those skilled in the art or elements that are substantially the same.

Figure 1:
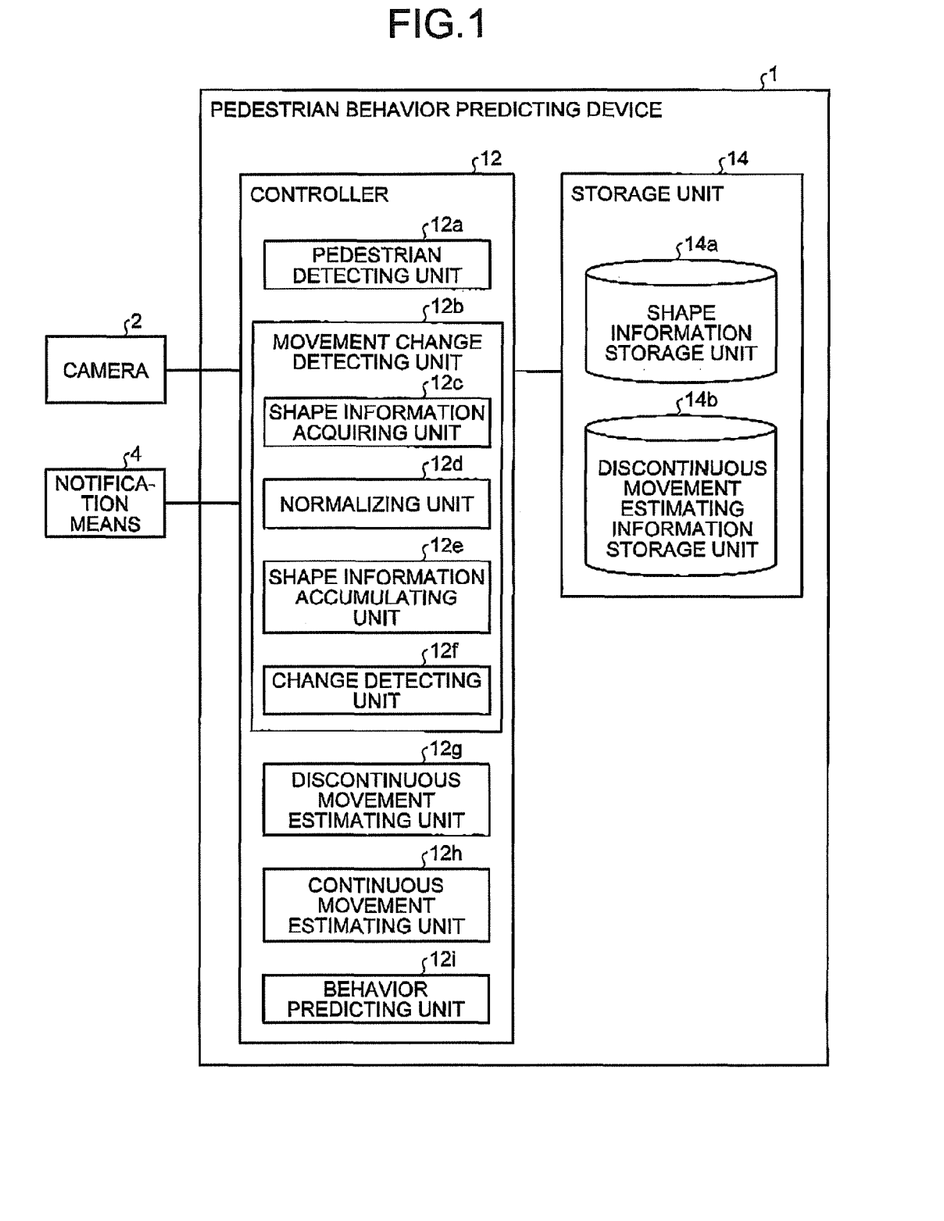
FIG. 1 is a block diagram illustrating one example of a configuration of the pedestrian behavior predicting device according to the present invention.

A configuration of a pedestrian behavior predicting device according to the present invention will be described with reference to FIG. 1. FIG. 1 is a block diagram illustrating one example of a configuration of the pedestrian behavior predicting device according to the present invention.

As illustrated in FIG. 1, a pedestrian behavior predicting device 1 is configured using an automobile control computer, and the like mounted on a vehicle, for example, and is communicably connected to a camera 2 and a notification means 4 mounted on the vehicle. The camera 2 is a device that captures an image of the periphery of the own vehicle and generates image data (imaged image) in which the periphery of the own vehicle is shown. The camera 2 is, for example, an imaging means such as a CCD camera, or a CMOS camera capable of performing imaging in a visible light region or an infrared light region. The camera 2 is installed at an arbitrary position where the periphery of the vehicle such as the front side, the side, and the back side of the vehicle can be imaged. In the present embodiment, the pedestrian behavior predicting device 1 may be simultaneously used with the camera 2, and a stereo camera, an imaging laser radar, and the like. The notification means 4 is a display that outputs image information, a speaker that outputs audio information, and the like. In the present embodiment, the notification means 4 is used to notify danger to a driver when the pedestrian at the periphery of the vehicle makes a dangerous move while the driver is driving the vehicle.

The pedestrian behavior predicting device 1 includes a controller 12 and a storage unit 14. The controller 12 comprehensively controls the pedestrian behavior predicting device 1, and is, for example, a CPU (Central Processing Unit), and the like. The storage unit 14 stores data, and is, for example, a RAM (Random Access Memory), a ROM (Read Only Memory), a hard disk, or the like.

The storage unit 14 includes a shape information storage unit 14a and a discontinuous movement estimating information storage unit 14b.

The shape information storage unit 14a is a shape information storage means that stores shape information of the pedestrian extracted from an imaged image imaged by the camera 2. The shape information is data indicating a feature amount of the shape of the pedestrian. The feature amount is not limited thereto, and includes at least one of a first feature amount, which uses a luminance itself of the imaged image, a second feature amount, which uses an edge of the imaged image, and a third feature amount, which uses a color of the imaged image. The first feature amount includes, for example, at least one of luminance, PCA of the luminance, Hu moment, LBP, Haarlike feature, and poselet. The second feature amount includes, for example, at least one of SIFT, PCA, SURF, GLOH, shape context, HOG, CoHOG, FIND, and edgelet. The third feature amount includes, for example, at least one of FGB and Lab.

The discontinuous movement estimating information storage unit 14b is a discontinuous movement estimating information storage means that stores image data at a time point the movement of the pedestrian changed, and discontinuous movement estimating information indicating the discontinuous movement of the pedestrian that occurs following the change in the movement of the pedestrian in correspondence.

The change in the movement of the pedestrian means the change in the dangerous movement of the pedestrian at the traffic environment, and includes change in shape at the start of change in the movement of the pedestrian, that is, the change in the feature amount of the image. The change in the movement of the pedestrian is not limited thereto, and includes, for example, sudden direction changing movement of the pedestrian, and sudden arm or leg raising movement of the pedestrian. The discontinuous movement includes, for example, the movement in which the pedestrian suddenly changes the advancing direction from the state of moving along the pavement, the movement in which the pedestrian suddenly moves at high speed from the state of moving at low speed along the pavement, and the movement in which the pedestrian suddenly starts to move from the stopped state. The discontinuous movement estimating information includes at least one of the moving direction or the moving speed of the pedestrian.

In the present embodiment, the data stored in the discontinuous movement estimating information storage unit 14b is stored in advance by the pedestrian behavior predicting device 1. Specifically, the pedestrian behavior predicting device 1 corresponds the image data at the time point the change in the movement of the pedestrian is detected to a vector indicating the moving direction and the moving speed representing the discontinuous movement taken by the pedestrian after the change in the movement of the pedestrian, and stores it in the discontinuous movement estimating information storage unit 14b. For example, if the pedestrian is moving along the pavement on the left side of the road, the pedestrian behavior predicting device 1 corresponds the image data at the time point the sudden direction changing movement toward the right of the pedestrian is detected to the vector indicating, the moving direction and the moving speed representing the movement in which the pedestrian advances toward the road after the sudden direction changing movement toward the right of the pedestrian, and stores it in the discontinuous movement estimating information storage unit 14b. That is, the discontinuous movement estimating information storage unit 14b stores the movement of the pedestrian toward a dangerous direction (right direction in this case) in which the pedestrian suddenly rushes out toward the road side from the pavement in advance as the discontinuous movement estimating information. Furthermore, the pedestrian behavior predicting device 1 corresponds the image data at the time point the sudden direction changing movement toward the left of the pedestrian is detected to the vector indicating the moving direction and the moving speed representing the movement in which the pedestrian moves toward a building after the sudden direction changing movement toward the left of the pedestrian, and stores it in the discontinuous movement estimating information storage unit 14b. That is, the discontinuous movement estimating information storage unit 14b stores the movement of the pedestrian toward a safe direction (left direction in this case) in which the pedestrian suddenly enters the building from the pavement in advance as the discontinuous movement estimating information. Therefore, in the present embodiment, the discontinuous movement estimating information storage unit 14b is configured as a knowledge base database that stores data acquired and accumulated beforehand by the pedestrian behavior predicting device 1.

The pedestrian behavior predicting device 1 may update the data stored in the discontinuous movement estimating information storage unit 14b by online learning. For example, the pedestrian behavior predicting device 1 may update the data by successively storing the image data for a predetermined time from the time point the change in the movement of the pedestrian is detected, analyzing the image data group, and predicting the discontinuous movement taken by the pedestrian after the change in the movement of the pedestrian.

The controller 12 includes a pedestrian detecting unit 12a, a movement change detecting unit 12b, a discontinuous movement estimating unit 12g, a continuous movement estimating unit 12h, and a behavior predicting unit 12i. The movement change detecting unit 12b further includes a shape information acquiring unit 12c, a normalizing unit 12d, a shape information accumulating unit 12e, and a change detecting unit 12f.

The pedestrian detecting unit 12a is a pedestrian detecting means for detecting a pedestrian from an imaged image. The pedestrian detecting unit 12a detects the pedestrian by performing pattern matching, and the like using data indicating the outline of the shape of the pedestrian stored in the storage unit 14 in advance. The pedestrian detecting unit 12a extracts a partial image including the pedestrian from the imaged image. The pedestrian detecting unit 12a also acquires the position of the pedestrian on the imaged image. The position of the pedestrian is preferably a three-dimensional, relative coordinate or an absolute coordinate with respect to the own vehicle.

The movement change detecting unit 12b is a movement change detecting means for detecting change in the movement of the pedestrian by accumulating the shape information of the pedestrian acquired from the partial image extracted by the pedestrian detecting unit 12a, and comparing the shape information of a predetermined time before and the current shape information using the accumulated shape information. The movement change detecting unit 12b may detect the change in the movement of the pedestrian by acquiring a feature amount distribution representing the shape information of the pedestrian acquired from the partial image extracted by the pedestrian detecting unit 12a, normalizing the shape information represented with the acquired feature amount distribution, accumulating the normalized shape information, and comparing the shape information of a predetermined time before and the current shape information using the accumulated shape information. The movement change detecting unit 12b detects the change in the movement of the pedestrian by the processes of the shape information acquiring unit 12c, the normalizing unit 12d, the shape information accumulating unit 12e, and the change detecting unit 12f.

The shape information acquiring unit 12c is a shape information acquiring means for acquiring the shape information of the pedestrian from the partial image extracted by the pedestrian detecting unit 12a. Specifically, the shape information acquiring unit 12c acquires the feature amount distribution representing the shape information of the pedestrian from the partial image extracted by the pedestrian detecting unit 12a using a predetermined feature amount. The predetermined feature amount is a feature amount that can be represented as a probability distribution, and includes at least one of the first feature amount, the second feature amount, and the third feature amount described above.

The normalizing unit 12d is a normalizing means for normalizing the shape information acquired by the shape information acquiring unit 12c. Specifically, the normalizing unit 12d normalizes the feature amount distribution acquired by the shape information acquiring unit 12c, and acquires a probability distribution corresponding to the relevant feature amount distribution.

The shape information accumulating unit 12e is a shape information accumulating means for accumulating the shape information normalized by the normalizing unit 12d. Specifically, the shape information accumulating unit 12e accumulates the probability distribution acquired by the normalizing unit 12d. In other words, the shape information accumulating unit 12e stores the normalized shape information (i.e., probability distribution) in the shape information storage unit 14a. In the present embodiment, the shape information accumulating unit 12e may accumulate the feature amount distribution before normalization acquired by the shape information acquiring unit 12c.

The change detecting unit 12f is a change detecting means for detecting the change in the movement of the pedestrian by comparing the shape information of a predetermined time before and the current shape information using the normalized shape information accumulated by the shape information accumulating unit 12e, that is, the normalized shape information stored in the shape information storage unit 14a. Specifically, the change detecting unit 12f calculates the difference between the probability distribution of a predetermined time before and the current probability distribution accumulated in the shape information storage unit 14a by the shape information accumulating unit 12e using a predetermined scale, and detects the change in the movement of the pedestrian when the calculated difference is greater than a predetermined threshold value. The predetermined scale is a scale for measuring the difference between the probability distributions with a distance or a pseudo-distance. The distance is not limited thereto, and includes Lp norm, for example, L1 norm (Manhattan distance), L2 norm (Euclidean distance), and L infinity norm (uniform norm). The distance may include a Mahalanobis distance. When using the Mahalanobis distance, the distribution is preferably created from a plurality of vectors p(t) of the past. The distance may include a Hamming distance. When using the Hamming distance, the numerical values are preferably discretized to a certain extent. The pseudo-distance is not limited thereto, and includes Kullback-Leibler divergence (hereinafter referred to as KL divergence). The KL divergence is the scale for measuring the distance between two probability distributions P, Q, and is well known in the field of information theory.

In the present embodiment, if the feature amount distribution of before normalization is accumulated by the shape information accumulating unit 12e, the change detecting unit 12f may normalize the feature amount distribution of a predetermined time before and the current feature amount distribution stored in the shape information storage unit 14a, acquire the probability distributions corresponding to each of the feature amount distribution the predetermined time before and the current feature amount distribution, calculate the difference between the acquired probability distribution of the predetermined time before and the current probability distribution using a predetermined scale, and detect the change in the movement of the pedestrian when the calculated difference is greater than a predetermined threshold value.

The discontinuous movement estimating unit 12g is a discontinuous movement estimating means for acquiring the discontinuous movement estimating information indicating the discontinuous movement of the pedestrian that occurs following the change in the movement of the pedestrian from the discontinuous movement estimating information storage unit 14b when the change in the movement of the pedestrian is detected by the movement change detecting unit 12b. Specifically, when the change in the movement of the pedestrian is detected by the movement change detecting unit 12b, the discontinuous movement estimating unit 12g searches the image data stored in the discontinuous movement estimating information storage unit 14b in advance corresponding to the image data at the time point the change in the movement of the pedestrian is detected by pattern matching, and the like. The discontinuous movement estimating unit 12g acquires the discontinuous movement estimating information corresponded in advance with the searched image data from the discontinuous movement estimating information storage unit 14b. The discontinuous movement estimating information includes at least one of the moving direction or the moving speed of the pedestrian.

When the change in the movement of the pedestrian is detected by the movement change detecting unit 12b, the discontinuous movement estimating unit 12g may calculate an optical flow of the imaged image and acquire the discontinuous movement estimating information using the optical flow. Specifically, the discontinuous movement estimating unit 12g calculates the vector (i.e., optical flow) indicating in which direction the pedestrian on the imaged image is moving based on a correlation of the partial image including the pedestrian and a background image of the periphery of the pedestrian from the temporally successive imaged image. The discontinuous movement estimating unit 12g acquires the discontinuous movement estimating information indicating the moving direction and the moving speed of the pedestrian using the calculated optical flow.

The continuous movement estimating unit 12h is a continuous movement estimating means for generating the continuous movement estimating information indicating the continuous movement of the pedestrian that occurs following the movement of the position of the pedestrian based on a history of positions of the pedestrian acquired by the pedestrian detecting unit 12a. The continuous movement includes, for example, the movement in which the pedestrian linearly advances at a constant speed from the pavement toward the road. The continuous movement estimating information includes at least one of the moving direction or the moving speed of the pedestrian. The continuous movement estimating unit 12h generates the continuous movement estimating information indicating the continuous movement (e.g., movement in which the pedestrian continuously moves, movement in which the pedestrian stops from the moving state, movement in which the pedestrian slows down, and the like) by linear prediction.

The behavior predicting unit 12i is a behavior predicting means for predicting the behavior of the pedestrian using the discontinuous movement estimating information acquired by the discontinuous movement estimating unit 12g. For example, when the pedestrian is moving along the pavement on the left side of the road, the behavior predicting unit 12i predicts the behavior of the pedestrian using the vector (i.e., discontinuous movement estimating information) indicating the moving direction and the moving speed representing the movement in which the pedestrian proceeds toward the road side after the sudden direction changing movement toward the right of the pedestrian acquired by the discontinuous movement estimating unit 12g. In this case, the behavior predicting unit 12i predicts, as the behavior of the pedestrian, the movement of the pedestrian toward a dangerous direction (right direction in this case) in which the pedestrian suddenly rushes out toward the road side from the pavement. The behavior predicting unit 12i predicts the behavior of the pedestrian using the vector (i.e., discontinuous movement estimating information) indicating the moving direction and the moving speed representing the movement in which the pedestrian moves toward the building after the sudden direction changing movement toward the left of the pedestrian acquired by the discontinuous movement estimating unit 12g. In this case, the behavior predicting unit 12i predicts, as the behavior of the pedestrian, the movement of the pedestrian toward a safe direction (left direction in this case) in which the pedestrian suddenly enters the building from the pavement. The behavior predicting unit 12i may predict the behavior of the pedestrian based on the continuous movement estimating information generated by the continuous movement estimating unit 12h. For example, when the pedestrian is linearly moving at a constant speed from the pavement toward the road, the behavior predicting unit 12i predicts, as the behavior of the pedestrian, the linear rush out movement of the pedestrian that can be linearly predicted as an extension of the movement. Furthermore, the behavior predicting unit 12i may predict, as the behavior of the pedestrian, the pathway indicating when and where the user is at, for example, based on the continuous movement estimating information or the discontinuous movement estimating information.

Now, a pedestrian behavior predicting process executed by the pedestrian behavior predicting device 1 described above will be described with reference to FIG. 2 to FIG. 5. Hereinafter, the pedestrian behavior predicting process executed by the pedestrian behavior predicting device 1 according to the present invention will be described in the order of a first embodiment and a second embodiment. In the pedestrian behavior predicting process below, SIFT feature amount will be described by way of example for the feature amount indicating the shape of the pedestrian, but this is not the sole case. The KL divergence will be described by way of example as a scale for measuring the difference between the probability distributions P, Q, but this is not the sole case.

[First Embodiment]

Figure 2:
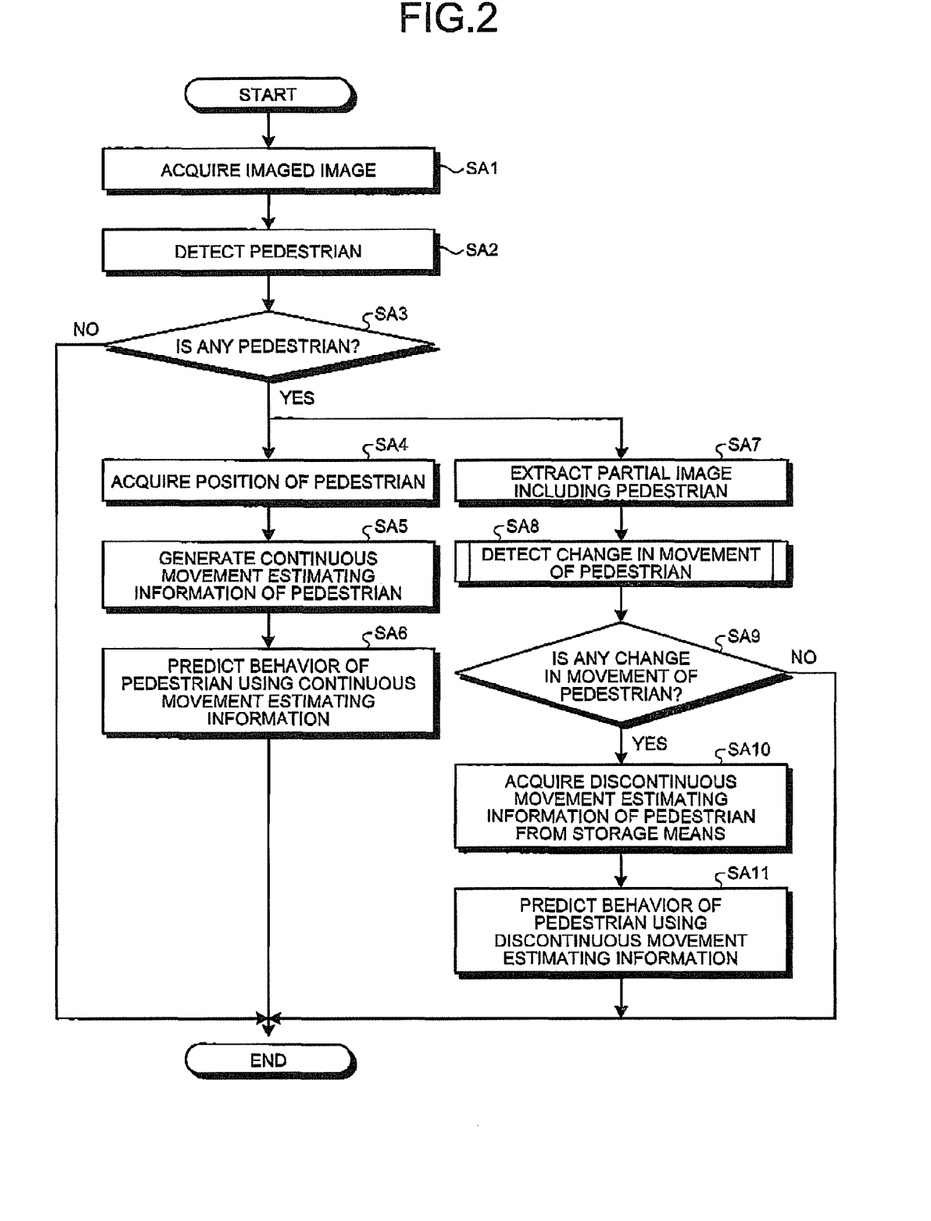
FIG. 2 is a flowchart illustrating an example of a pedestrian behavior predicting process according to a first embodiment.
Figure 3:
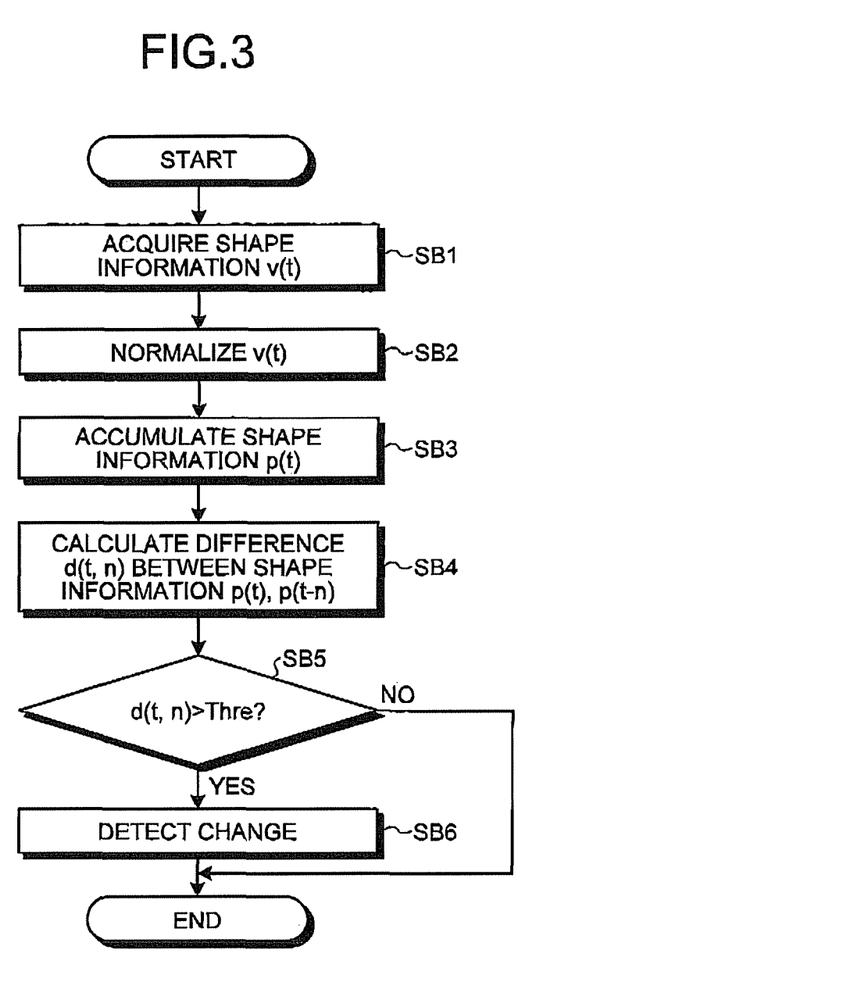
FIG. 3 is a flowchart illustrating an example of a movement change detecting process according to the first embodiment.
Figure 4:
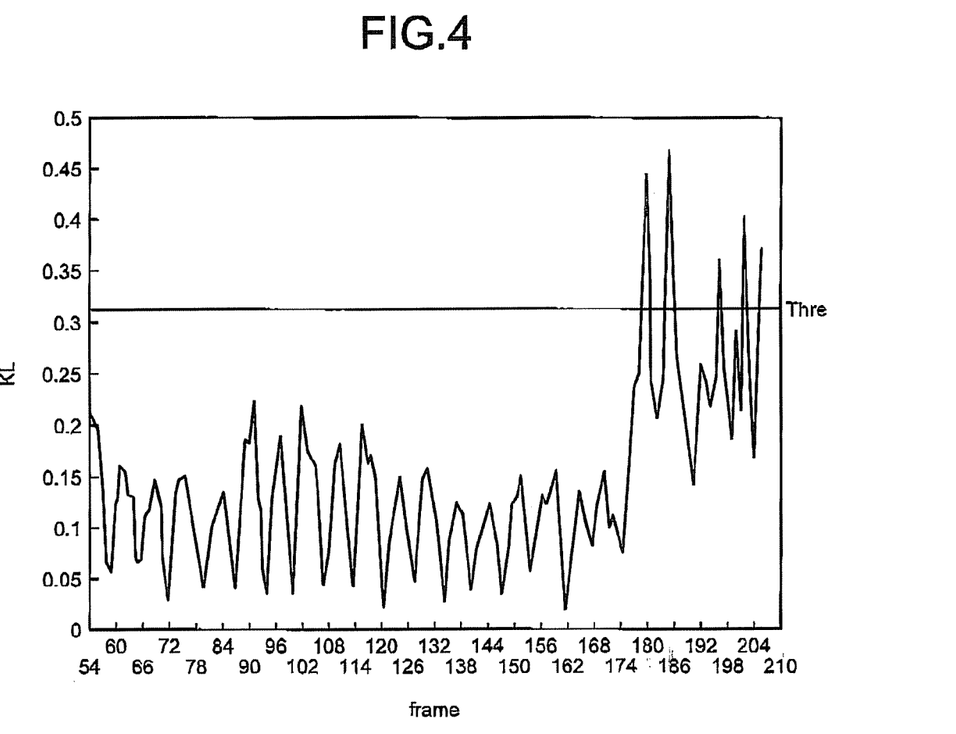
FIG. 4 is a view illustrating an example of a movement change detection graph according to the first embodiment.

The pedestrian behavior predicting process according to the first embodiment will be described with reference to FIG. 2 to FIG. 4. FIG. 2 is a flowchart illustrating an example of a pedestrian behavior predicting process according to the first embodiment. FIG. 3 is a flowchart illustrating an example of a movement change detecting process according to the first embodiment. FIG. 4 is a view illustrating an example of a movement change detection graph according to the first embodiment. In the present embodiment, the pedestrian behavior predicting process is assumed to be repeatedly executed while the driver is driving the vehicle.

As illustrated in FIG. 2, the controller 12 of the pedestrian behavior predicting device 1 first acquires an imaged image, in which the periphery of the own vehicle is shown, from the camera 2 (step SA1).

Next, the pedestrian detecting unit 12a of the pedestrian behavior predicting device 1 detects the pedestrian from the imaged image acquired in step SA1 (step SA2). For example, the pedestrian detecting unit 12a detects an object by performing pattern matching, and the like using the data indicating the outline of the shape of the pedestrian stored in the storage unit 14 in advance.

The controller 12 of the pedestrian behavior predicting device 1 then determines whether or not the pedestrian is detected in step SA2 (step SA3). The controller 12 proceeds to the processes of the next step SA4 and step SA7 when determining that the pedestrian is detected in step SA3 (step SA3: Yes). That is, the controller 12 executes in parallel the processes shown in steps SA4 to SA6 and the processes shown in steps SA7 to SA11 when determining that the pedestrian is detected in step SA3. The controller 12 terminates the pedestrian behavior predicting process as is when determining that the pedestrian is not detected in step SA3 (step SA3: No).

The pedestrian detecting unit 12a of the pedestrian behavior predicting device 1 then acquires the position of the pedestrian on the imaged image (step SA4) when determining that the pedestrian is detected in step SA3 (step SA3: Yes). The pedestrian detecting unit 12a acquires the three-dimensional relative coordinate or the absolute coordinate with respect to the own vehicle for the position of the pedestrian.

The continuous movement estimating unit 12h of the pedestrian behavior predicting device 1 then generates the continuous movement estimating information indicating the continuous movement of the pedestrian that occurs following the movement of the position of the pedestrian based on a history of positions of the pedestrian acquired by the pedestrian detecting unit 12a in step SA4 (step SA5). The continuous movement includes, for example, the movement in which the pedestrian linearly advances at a constant speed from the pavement toward the road. The continuous movement estimating information includes at least one of the moving direction or the moving speed of the pedestrian. The continuous movement estimating unit 12h generates the continuous movement estimating information indicating the continuous movement (e.g., movement in which the pedestrian continuously moves, movement in which the pedestrian stops from the moving state, movement in which the pedestrian slows down, and the like) by linear prediction.

The behavior predicting unit 12*i* of the pedestrian behavior predicting device 1 predicts the behavior of the pedestrian using the continuous movement estimating information generated by the continuous movement estimating unit 12*h* in step SA5 (step SA6). For example, when the pedestrian is linearly moving at a constant speed from the pavement toward the road, the behavior predicting unit 12*i* predicts, as the behavior of the pedestrian, the linear rush out movement of the pedestrian that can be linearly predicted as an extension of the movement. Thereafter, the pedestrian behavior predicting process is terminated.

Returning back to step SA3, the pedestrian detecting unit 12*a* of the pedestrian behavior predicting device 1 extracts the partial image including the pedestrian from the imaged image (step SA7) when determining that the pedestrian is detected in step SA3 (step SA3: Yes).

The movement change detecting unit 12*b* of the pedestrian behavior predicting device 1 then detects the change in the movement of the pedestrian (step SA8) by normalizing the shape information of the pedestrian acquired from the partial image extracted by the pedestrian detecting unit 12*a* in step SA7, accumulating the normalized shape information, and comparing the shape information of a predetermined time before and the current shape information using the accumulated shape information. The change in the movement of the pedestrian means the change in the dangerous movement of the pedestrian at the traffic environment, and includes change in shape at the start of change in the movement of the pedestrian, that is, the change in the feature amount of the image. The change in the movement of the pedestrian is not limited thereto, and includes, for example, sudden direction changing movement of the pedestrian, and sudden arm or leg raising movement of the pedestrian.

The details of the movement change detecting process executed by the movement change detecting unit 12*b* in step SA8 will now be described with reference to FIG. 3 and FIG. 4. As will be described below, the movement change detecting unit 12*b* detects the change in the movement of the pedestrian by the processes of the shape information acquiring unit 12*c*, the normalizing unit 12*d*, the shape information accumulating unit 12*e*, and the change detecting unit 12*f*.

As illustrated in FIG. 3, the shape information acquiring unit 12*c* of the pedestrian behavior predicting device 1 acquires the shape information of the pedestrian from the partial image extracted by the pedestrian detecting unit 12*a* in step SA7 of FIG. 2 (step SB1). Specifically, the shape information acquiring unit 12*c* carries out the calculation of the SIFT feature amount as the feature amount distribution v(t) representing the shape information of the pedestrian from the partial image extracted by the pedestrian detecting unit 12*a* in step SA7 of FIG. 2. The SIFT feature amount is well known in the field of image recognition, and the like as a feature amount that represents shape. Furthermore, the SIFT feature amount represents, with a histogram, the edge in which direction is distributed in which portion of the imaged image including the object, and thus can be represented as the probability distribution.

The normalizing unit 12*d* of the pedestrian behavior predicting device 1 then normalizes the L1 norm of the feature amount distribution v(t) acquired in step SB1 to 1, and acquires the feature amount (probability distribution) p(t) as illustrated in the following equation (1) (step SB2).

$$\Sigma_i |p_i(t)| = 1 \qquad (1)$$

The shape information accumulating unit 12*e* of the pedestrian behavior predicting device 1 accumulates the shape information acquired in step SB2 in the shape information storage unit 14*a* (step SB3). In other words, the shape information accumulating unit 12*e* carries out the accumulation of the feature amount (probability distribution) p(t) normalized in step SB2.

The change detecting unit 12*f* of the pedestrian behavior predicting device 1 carries out the calculation of the difference d(t, n) between the feature amount of n frames before and the current feature amount from the feature amount (probability distribution) p(t) accumulated in step SB3 (step SB4). The controller 12 carries out the calculation of the difference d(t, n) using the KL divergence, as illustrated in the following equation (3).

$$d(t,n) = D_{KL}(p(t)||p(t-n)) \qquad (2)$$

$$D_{KL}(P||Q) = \sum_i P(i) \log \frac{P(i)}{Q(i)} \qquad (3)$$

The change detecting unit 12*t* of the pedestrian behavior predicting device 1 determines whether or not the difference d(t, n) calculated in step SB4 is greater than a predetermined threshold value Thre, as illustrated in FIG. 4 (step SB5). The vertical axis of FIG. 4 indicates the KL divergence, and the horizontal axis indicates the frame of time. In FIG. 4, a state in which the object pedestrian is moving along the pavement is illustrated in frames 54 to 174, and a state in which the pedestrian suddenly changed the movement is illustrated in frame 180.

The change detecting unit 12*f* of the pedestrian behavior predicting device 1 determines that there is change in the movement of the pedestrian when determining that the difference d(t, n) is greater than the threshold value Thre in step SB5 (step SB6). Thereafter, the movement change detecting process is terminated. When determining that the difference d(t, n) is smaller than the threshold value Thre in step SB5 (step SB5: No), the change detecting unit 12*f* determines that there is no change in the movement of the pedestrian, and terminates the movement change detecting process as is. That is, the pedestrian behavior predicting device 1 proceeds to the process of step SA9 of FIG. 2 after terminating the movement change detecting process illustrated in FIG. 3.

Returning again back to FIG. 2, the pedestrian behavior predicting process according to the first embodiment will be continued. The controller 12 of the pedestrian behavior predicting device 1 determines whether or not the change in the movement of the pedestrian is detected in step SA8 (step SA9). The controller 12 proceeds to the process of the next step SA10 when determining that the change in the movement of the pedestrian is detected in step SA9 (step SA9: Yes). The controller 12 terminates the pedestrian behavior predicting process when determining that the change in the movement of the pedestrian is not detected in step SA9 (step SA9: No).

When determining that the change in the movement of the pedestrian is detected in step SA8 (step SA9: Yes), the discontinuous movement estimating unit 12*g* of the pedestrian behavior predicting device 1 acquires the discontinuous movement estimating information indicating the discontinuous movement of the pedestrian that occurs following the change in the movement of the pedestrian from the discontinuous movement estimating information storage unit 14*b* (step SA10). The discontinuous movement includes, for example, the movement in which the pedestrian suddenly changes the advancing direction and proceeds toward the road side from the state of moving along the pavement, the movement in which the pedestrian suddenly moves at high speed from the state of moving at low speed along the pavement, and the movement in which the pedestrian suddenly starts to move from the stopped state. The discontinuous movement estimating information includes at least one of the moving direction or the moving speed of the pedestrian.

Specifically, in step SA10, the discontinuous movement estimating unit 12g searches by pattern matching, and the like the image data stored in the discontinuous movement estimating information storage unit 14b in advance corresponding to the image data at the time point the change in the movement of the pedestrian is detected when the change in the movement of the pedestrian is detected in step SA9. The discontinuous movement estimating unit 12g acquires the discontinuous movement estimating information corresponded in advance with the searched image data from the discontinuous movement estimating information storage unit 14b.

The behavior predicting unit 12i of the pedestrian behavior predicting device 1 then predicts the behavior of the pedestrian using the discontinuous movement estimating information acquired by the discontinuous movement estimating unit 12g in step SA10 (step SA11). Thereafter, the pedestrian behavior predicting process is terminated.

For example, when the pedestrian is moving along the pavement on the left side of the road, the behavior predicting unit 12i predicts the behavior of the pedestrian using the vector (i.e., discontinuous movement estimating information) indicating the moving direction and the moving speed representing the movement in which the pedestrian proceeds toward the road side after the sudden direction changing movement toward the right of the pedestrian acquired by the discontinuous movement estimating unit 12g in step SA10. That is, the behavior predicting unit 12i predicts the movement of the pedestrian toward the dangerous direction (right direction in this case) in which the pedestrian suddenly rushes out from the pavement toward the road as the behavior of the pedestrian. The behavior predicting unit 12i predicts the behavior of the pedestrian using the vector (i.e., discontinuous movement estimating information) indicating the moving direction and the moving speed representing the movement in which the pedestrian moves toward the building after the sudden direction changing movement toward the left of the pedestrian acquired by the discontinuous movement estimating unit 12g in step SA10. That is, the behavior predicting unit 12i predicts the movement of the pedestrian toward the safe direction (left direction in this case) in which the pedestrian suddenly enters the building from the pavement as the behavior of the pedestrian. Furthermore, the behavior predicting unit 12i may predict, as the behavior of the pedestrian, the pathway indicating when and where the user is at, for example, based on the continuous movement estimating information or the discontinuous movement estimating information. Thereafter, the pedestrian behavior predicting process is terminated.

The controller 12 of the pedestrian behavior predicting device 1 outputs the image information and/or the audio information that calls the attention on the pedestrian to the driver of the vehicle through the notification means 4 based on the prediction result of the predicted behavior of the pedestrian after terminating the pedestrian behavior predicting process. The controller 12 of the pedestrian behavior predicting device 1 may execute the vehicle control to avoid collision with the pedestrian based on the prediction result of the predicted behavior of the pedestrian.

According to the first embodiment, the behavior of the pedestrian at the periphery of the vehicle can be rapidly and accurately predicted than the prior art. For example, the pedestrian detecting device described in the patent literature 1 can capture the movement of the pedestrian and predict the linear rush out movement (continuous movement) of the pedestrian that is linearly predictable as the extension of the movement, but cannot predict the movement (discontinuous movement) of suddenly changing direction and rushing out to the road. According to the first embodiment, even the discontinuous movement can be predicted, and thus the behavior of the pedestrian can be rapidly and accurately predicted than the prior art. Furthermore, the pedestrian rush out predicting device described in the patent literature 2 cannot ensure sufficient precision of environmental recognition and thus can still be improved. According to the first embodiment, the continuous movement is predicted by linear prediction when there is no change in the movement of the pedestrian, and the discontinuous movement is predicted from the shape change of the imaged image when there is change in the movement of the pedestrian, and hence the pedestrian behavior predicting method corresponding to various environments can be applied, and as a result, the behavior of the pedestrian of the periphery of the vehicle can be rapidly and accurately predicted than the prior art. Thus, according to the first embodiment, when the pedestrian at the periphery of the vehicle makes a dangerous move while the driver is driving the vehicle, the danger can be notified to the driver rapidly and accurately so that the possibility of occurrence of traffic accident can be reduced.

Furthermore, the pedestrian behavior predicting device 1 according to the first embodiment corresponds the image data at the time point the change in the movement of the pedestrian is detected to the vector indicating the moving direction and the moving speed representing the discontinuous movement taken by the pedestrian after the change in the movement of the pedestrian, and stores it in the discontinuous movement estimating information storage unit 14b. Thus, according to the first embodiment, consideration can be made even to the direction in which the discontinuous movement after the change in the movement of the pedestrian is detected is performed. As a result, the behavior of the pedestrian can be predicted in a distinguished manner of whether being carried out toward the dangerous direction or whether being carried out toward the safe direction according to the first embodiment.

For example, the pedestrian behavior predicting device 1 according to the first embodiment corresponds the image data at the time point the sudden direction changing movement toward the right of the pedestrian is detected to the vector indicating the moving direction and the moving speed representing the movement in which the pedestrian proceeds toward the road side after the sudden direction changing movement toward the right of the pedestrian, and stores it in the discontinuous movement estimating information storage unit 14b. Thus, for example, when the pedestrian is moving along the pavement on the left side of the road, the movement of the pedestrian toward the dangerous direction (right direction in this case) in which the pedestrian suddenly rushes out toward the road side from the pavement can be predicted as the behavior of the pedestrian based on the discontinuous movement estimating information stored in the discontinuous movement estimating information storage unit 14b according to the first embodiment.

The pedestrian behavior predicting device 1 according to the first embodiment corresponds the image data at the time point the sudden direction changing movement toward the left of the pedestrian is detected to the vector indicating the moving direction and the moving speed representing the movement in which the pedestrian moves toward the building after the sudden direction changing movement toward the left of the pedestrian, and stores it in the discontinuous movement estimating information storage unit 14b. Thus, for example, when the pedestrian is moving along the pavement on the left side of the road, the movement of the pedestrian toward the safe direction (left direction in this case) in which the pedestrian suddenly enters the building from the pavement can be predicted as the behavior of the pedestrian based on the discontinuous movement estimating information stored in the discontinuous movement estimating information storage unit 14b according to the first embodiment.

Thus, according to the first embodiment, when the pedestrian at the periphery of the vehicle makes a dangerous move while the driver is driving the vehicle, the danger can be notified to the driver more rapidly and accurately, so that the possibility of occurrence of traffic accidents can be further reduced.

[Second Embodiment]

Figure 5:
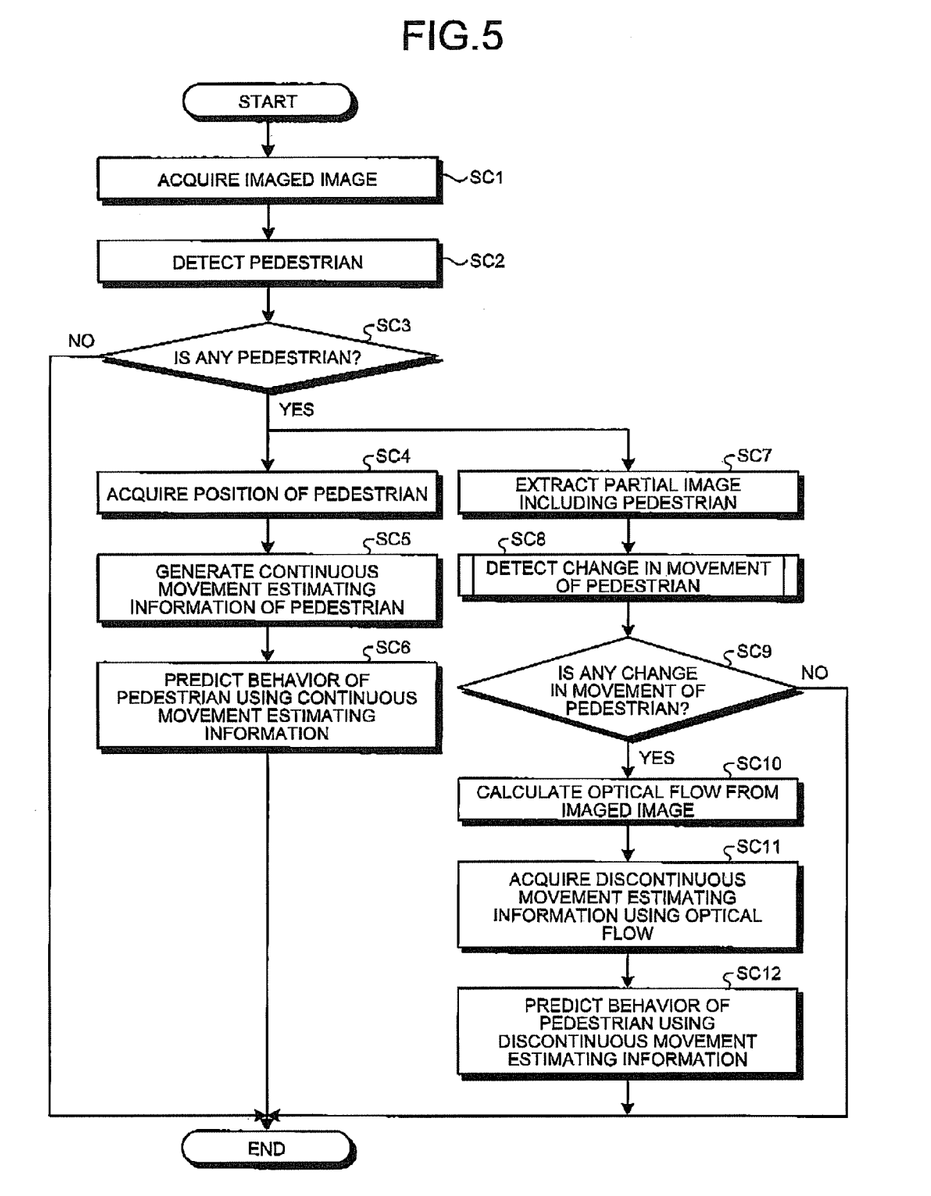
FIG. 5 is a flowchart illustrating one example of a pedestrian behavior predicting process according to a second embodiment.

A pedestrian behavior predicting process according to a second embodiment will now be described with reference to FIG. 5. FIG. 5 is a flowchart illustrating one example of the pedestrian behavior predicting process according to the second embodiment. In the present embodiment, the pedestrian behavior predicting process is assumed to be repeatedly executed while the driver is driving the vehicle.

As illustrated in FIG. 5, the controller 12 of the pedestrian behavior predicting device 1 first acquires the imaged image in which the periphery of the own vehicle is shown from the camera 2 (step SC1).

Next, the pedestrian detecting unit 12a of the pedestrian behavior predicting device 1 detects the pedestrian from the imaged image acquired in step SC1 (step SC2).

The controller 12 of the pedestrian behavior predicting device 1 then determines whether or not the pedestrian is detected in step SC2 (step SC3). The controller 12 proceeds to the processes of the next step SC4 and step SC7 when determining that the pedestrian is detected in step SC3 (step SC3: Yes). That is, the controller 12 executes in parallel the processes shown in steps SC4 to SC6 and the processes shown in steps SC7 to SC12 when determining that the pedestrian is detected in step SC3. The controller 12 terminates the pedestrian behavior predicting process as is when determining that the pedestrian is not detected in step SC3 (step SC3: No).

The pedestrian detecting unit 12a of the pedestrian behavior predicting device 1 acquires the position of the pedestrian on the imaged image (step SC4) when determining that the pedestrian is detected in step SC3 (step SC3: Yes).

The continuous movement estimating unit 12h of the pedestrian behavior predicting device 1 then generates the continuous movement estimating information indicating the continuous movement of the pedestrian that occurs following the movement of the position of the pedestrian based on a history of positions of the pedestrian acquired by the pedestrian detecting unit 12a in step SC4 (step SC5). The continuous movement includes, for example, the movement in which the pedestrian linearly advances at a constant speed from the pavement toward the road. The continuous movement estimating information includes at least one of the moving direction or the moving speed of the pedestrian.

The behavior predicting unit 12i of the pedestrian behavior predicting device 1 predicts the behavior of the pedestrian using the continuous movement estimating information generated by the continuous movement estimating unit 12h in step SC5 (step SC6). Thereafter, the pedestrian behavior predicting process is terminated.

Returning back to step SC3, the pedestrian detecting unit 12a of the pedestrian behavior predicting device 1 extracts the partial image including the pedestrian from the imaged image (step SC7) when determining that the pedestrian is detected in step SC3 (step SC3: Yes).

The movement change detecting unit 12b of the pedestrian behavior predicting device 1 detects the change in the movement of the pedestrian based on the partial image extracted by the pedestrian detecting unit 12a in step SC7 (step SC8). The details of the movement change detecting process executed by the movement change detecting unit 12b in step SC8 are similar to FIG. 3 and FIG. 4 described above, and thus the description thereof will be omitted.

The controller 12 of the pedestrian behavior predicting device 1 then determines whether or not the change in the movement of the pedestrian is detected in step SC8 (step SC9). The controller 12 proceeds to the process of the next step SC10 when determining that the change in the movement of the pedestrian is detected in step SC9 (step SC9: Yes). The controller 12 terminates the pedestrian behavior predicting process when determining that the change in the movement of the pedestrian is not detected in step SC9 (SC9: No).

The discontinuous movement estimating unit 12g of the pedestrian behavior predicting device 1 calculates the optical flow of the imaged image (step SC10) when determining that the change in the movement of the pedestrian is detected in step SC8 (step SC9: Yes). Specifically, the discontinuous movement estimating unit 12g calculates the vector (i.e., optical flow) indicating in which direction the pedestrian on the imaged image is moving based on a correlation of the partial image including the pedestrian and a background image of the periphery of the pedestrian from the temporally successive imaged image.

The discontinuous movement estimating unit 12g of the pedestrian behavior predicting device 1 acquires the discontinuous movement estimating information indicating the discontinuous movement that occurs following the change in the movement of the pedestrian using the optical flow calculated in step SC10 (step SC11). The discontinuous movement includes, for example, the movement in which the pedestrian suddenly changes the advancing direction and proceeds toward the road side from the state of moving along the pavement, the movement in which the pedestrian suddenly moves at high speed from the state of moving at low speed along the pavement, and the movement in which the pedestrian suddenly starts to move from the stopped state. The discontinuous movement estimating information includes at least one of the moving direction or the moving speed of the pedestrian.

The behavior predicting unit 12i of the pedestrian behavior predicting device 1 predicts the behavior of the pedestrian using the discontinuous movement estimating information acquired by the discontinuous movement estimating unit 12g in step SC11 (step SC12). Thereafter, the pedestrian behavior predicting process is terminated.

The controller 12 of the pedestrian behavior predicting device 1 outputs the image information and/or the audio information that calls the attention on the pedestrian to the driver of the vehicle through the notification means 4 based on the prediction result of the predicted behavior of the pedestrian after terminating the pedestrian behavior predicting process. The controller 12 of the pedestrian behavior predicting device 1 may execute the vehicle control to avoid collision with the pedestrian based on the prediction result of the predicted behavior of the pedestrian.

According to the second embodiment, the vector (i.e., discontinuous movement estimating information) indicating the moving direction and the moving speed representing the discontinuous movement taken by the pedestrian after the change in the movement of the pedestrian can be acquired using the optical flow calculated from the imaged image. Thus, according to the second embodiment, consideration can also be made on the direction of the discontinuous movement of after the change in the movement of the pedestrian is detected, similar to the first embodiment described above, even if the discontinuous movement estimating information is not stored in the storage means in advance. As a result, according to the second embodiment, the behavior of the pedestrian can be predicted in a distinguished manner of whether being carried out toward the dangerous direction or whether being carried out toward the safe direction. Therefore, according to the second embodiment, when the pedestrian at the periphery of the vehicle makes a dangerous move while the driver is driving the vehicle, the danger can be notified to the driver more rapidly and accurately, and thus the possibility of occurrence of traffic accidents can be further reduced, similar to the first embodiment described above.

REFERENCE SIGNS LIST 1 pedestrian behavior predicting device
12 controller
12a pedestrian detecting unit
12b movement change detecting unit
12c shape information acquiring unit
12d normalizing unit
12e shape information accumulating unit
12f change detecting unit
12g discontinuous movement estimating unit
12h continuous movement estimating unit
12i behavior predicting unit
14 storage unit
14a shape information storage unit
14b discontinuous movement estimating information storage unit
2 camera
4 notification means

The invention claimed is:

1. A pedestrian behavior predicting device comprising:
a processor including hardware; and
a storage unit including memory storing instructions executable by the processor and for storing shape information of a pedestrian, wherein the processor executes the instructions stored in the memory to cause the pedestrian behavior predicting device to:
detect a pedestrian from an imaged image; acquired at a current time
extract a partial image including the detected pedestrian from the imaged image;
acquire shape information of the pedestrian from the extracted partial image, the shape information of the pedestrian including at least one of a luminance of the partial image, an edge of the partial image, and a color of the partial image;
accumulate the acquired shape information of the pedestrian in the storage unit;
detect a change in movement of the pedestrian by comparing shape information of the pedestrian from an image captured a predetermined time before the current time and the acquired shape information of the pedestrian using the accumulated shape information of the pedestrian,
store first images and pieces of discontinuous movement estimating information in the storage unit such that each first image is associated with each piece of discontinuous movement estimating information, the first image being an image that was acquired at a time when a first change in the movement of the pedestrian is detected, the piece of discontinuous movement estimating information being information indicating a discontinuous movement of the pedestrian that occurs following the first change in the movement of the pedestrian;
wherein when a second change in the movement of the pedestrian is detected, search, from the first images stored in the storage unit, a first image corresponding to a second image when the second change in the movement of the pedestrian is detected;
acquire a piece of discontinuous movement estimating information associated with the searched first image; and
predict a behavior of the pedestrian using the acquired piece of discontinuous movement estimating information.

2. The pedestrian behavior predicting device according to claim 1, wherein
the processor further executes the instructions stored in the memory to cause the pedestrian behavior predicting device to:
detect the change in the movement of the pedestrian by acquiring a feature amount distribution representing the shape information of the pedestrian acquired from the extracted partial image, normalize the shape information represented by the acquired feature amount distribution, accumulate the normalized shape information, and compare the shape information of the image captured a predetermined time before the current time and the acquired shape information using the accumulated shape information.

3. The pedestrian behavior predicting device according to claim 2, wherein
the processor further executes the instructions stored in the memory to cause the pedestrian behavior predicting device to:
calculate an optical flow of the imaged image and acquire the discontinuous movement estimating information using the optical flow at the time the first change in the movement of the pedestrian is detected.

4. The pedestrian behavior predicting device according to claim 3, wherein
the discontinuous movement estimating information includes at least one of a moving direction and a moving speed of the pedestrian.

5. The pedestrian behavior predicting device according to claim 2, wherein
the processor further executes the instructions stored in the memory to cause the pedestrian behavior predicting device to:
acquire a position of the pedestrian on the imaged image,
generate continuous movement estimating information indicating a continuous movement of the pedestrian that occurs following movement of the position of the pedestrian based on a history of positions of the pedestrian acquired, and predict the behavior of the pedestrian based on the continuous movement estimating information generated.

6. The pedestrian behavior predicting device according to claim 2, wherein
the discontinuous movement estimating information includes at least one of a moving direction and a moving speed of the pedestrian.

7. The pedestrian behavior predicting device according to claim 2, wherein
the processor further executes the instructions stored in the memory to cause the pedestrian behavior predicting device to:
acquire the feature amount distribution of the pedestrian from the extracted partial image using a predetermined feature amount,
normalize the acquired feature amount distribution and acquire a probability distribution corresponding to the feature amount distribution,
accumulate the acquired probability distribution, and
calculate a difference between the probability distribution of an image captured a predetermined time before the current time and the acquired probability distribution using a predetermined scale, and detect the change in the movement of the pedestrian when the calculated difference is greater than a predetermined threshold value.

8. The pedestrian behavior predicting device according to claim 1, wherein
the processor further executes the instructions stored in the memory to cause the pedestrian behavior predicting device to:
calculate an optical flow of the imaged image and acquire the discontinuous movement estimating information using the optical flow at the time the first change in the movement of the pedestrian is detected.

9. The pedestrian behavior predicting device according to claim 8, wherein
the processor further executes the instructions stored in the memory to cause the pedestrian behavior predicting device to:
acquire a position of the pedestrian on the imaged image,
generate continuous movement estimating information indicating a continuous movement of the pedestrian that occurs following movement of the position of the pedestrian based on a history of positions of the pedestrian acquired, and
predict the behavior of the pedestrian based on the continuous movement estimating information generated.

10. The pedestrian behavior predicting device according to claim 8, wherein
the discontinuous movement estimating information includes at least one of a moving direction and a moving speed of the pedestrian.

11. The pedestrian behavior predicting device according to claim 1, wherein
the processor further executes the instructions stored in the memory to cause the pedestrian behavior predicting device to:
acquire a position of the pedestrian on the imaged image,
generate continuous movement estimating information indicating a continuous movement of the pedestrian that occurs following movement of the position of the pedestrian based on a history of positions of the pedestrian acquired, and
predict the behavior of the pedestrian based on the continuous movement estimating information generated.

12. The pedestrian behavior predicting device according to claim 1, wherein
the discontinuous movement estimating information includes at least one of a moving direction and a moving speed of the pedestrian.

13. The pedestrian behavior predicting device according to claim 1, wherein
the processor further executes the instructions stored in the memory to cause the pedestrian behavior predicting device to:
acquire a feature amount distribution of the pedestrian from the extracted partial image using a predetermined feature amount,
normalize the acquired feature amount distribution and acquire a probability distribution corresponding to the feature amount distribution,
accumulate the acquired probability distribution, and
calculate a difference between the probability distribution of an image captured a predetermined time before the current time and the acquired probability distribution using a predetermined scale, and detect the change in the movement of the pedestrian when the calculated difference is greater than a predetermined threshold value.

14. A pedestrian behavior predicting method for a pedestrian behavior predicting device, the pedestrian behavior predicting device including a processor having hardware and a storage unit including memory storing instructions executable by the processor and for storing shape information of a pedestrian, wherein the processor executes the instructions stored in the memory of the pedestrian behavior predicting device, the method comprising the steps of:
detecting a pedestrian from an imaged image; acquired at a current time
extracting a partial image including the detected pedestrian from the imaged image;
acquiring shape information of the pedestrian from the extracted partial image, the shape information of the pedestrian including at least one of a luminance of the partial image, an edge of the partial image, and a color of the partial image;
accumulating the acquired shape information of the pedestrian in the storage unit; and
detecting a change in movement of the pedestrian by comparing shape information of the pedestrian from an image captured a predetermined time before the current time and the acquired shape information of the pedestrian using the accumulated shape information of the pedestrian;
storing first images and pieces of discontinuous movement estimating information in the storage unit such that each first image is associated with each piece of discontinuous movement estimating information, the first image being an image that was acquired at a time when a first change in the movement of the pedestrian is detected, the piece of discontinuous movement estimating information being information indicating a discontinuous movement of the pedestrian that occurs following the first change in the movement of the pedestrian;
searching, when a second change in the movement of the pedestrian is detected, from the first images stored in the storage unit, a first image corresponding to a second image when the second change in the movement of the pedestrian is detected;

acquiring a piece of discontinuous movement estimating information associated with the searched first image; and predicting a behavior of the pedestrian using the acquired piece of discontinuous movement estimating information.

15. The pedestrian behavior predicting method according to claim 14, the method further comprising steps of:

acquiring a feature amount distribution representing the shape information of the pedestrian acquired from the partial image extracted, normalizing the shape information represented with the acquired feature amount distribution, accumulating the normalized shape information and comparing the shape information of the image captured a predetermined time before the current time and the acquired shape information.

16. The pedestrian behavior predicting method according to claim 15, the method further comprising a step of:

calculating an optical flow of the imaged image, wherein the discontinuous movement estimating information is acquired using the optical flow at the time the first change in the movement of the pedestrian is detected.

17. The pedestrian behavior predicting method according to claim 15, the method further comprising steps of:

acquiring a position of the pedestrian on the imaged image, and the pedestrian behavior predicting method further comprises generating continuous movement estimating information indicating a continuous movement of the pedestrian that occurs following movement of the position of the pedestrian based on a history of positions of the pedestrian acquired in the pedestrian detecting step, wherein the behavior of the pedestrian is predicted based on the continuous movement estimating information generated.

18. The pedestrian behavior predicting method according to claim 14, the method further comprising steps of:

calculating an optical flow of the imaged image wherein estimating information is acquired using the optical flow at the time the first change in the movement of the pedestrian is detected.

19. The pedestrian behavior predicting method according to claim 18, the method further comprising steps of:

acquiring a position of the pedestrian on the imaged image, and generating continuous movement estimating information indicating a continuous movement of the pedestrian that occurs following movement of the position of the pedestrian based on a history of positions of the pedestrian acquired, wherein the behavior of the pedestrian is predicted based on the continuous movement estimating information generated.

20. The pedestrian behavior predicting method according to claim 14, the method further comprising steps of:

acquiring a position of the pedestrian on the imaged image, and generating continuous movement estimating information indicating a continuous movement of the pedestrian that occurs following movement of the position of the pedestrian based on a history of positions of the pedestrian acquired, wherein the behavior of the pedestrian is predicted based on the continuous movement estimating information generated.

* * * * *